Patented July 30, 1940

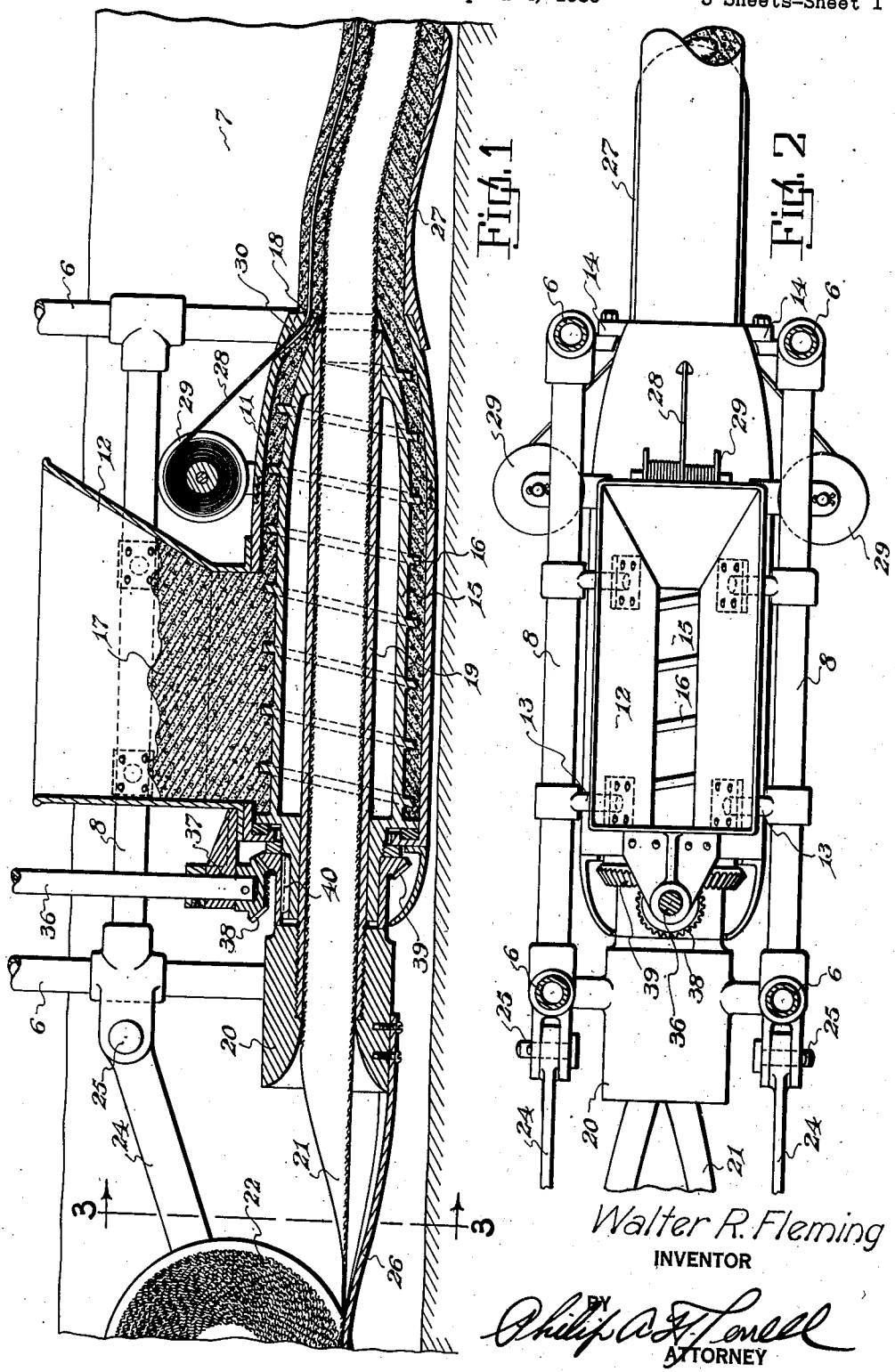

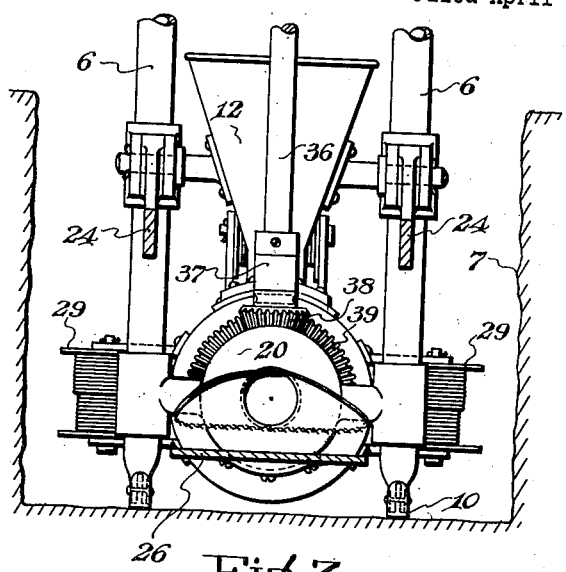
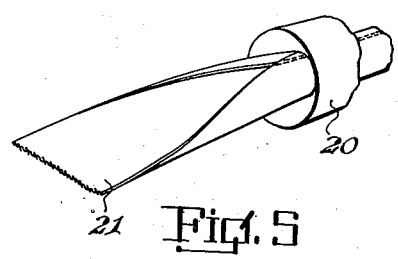
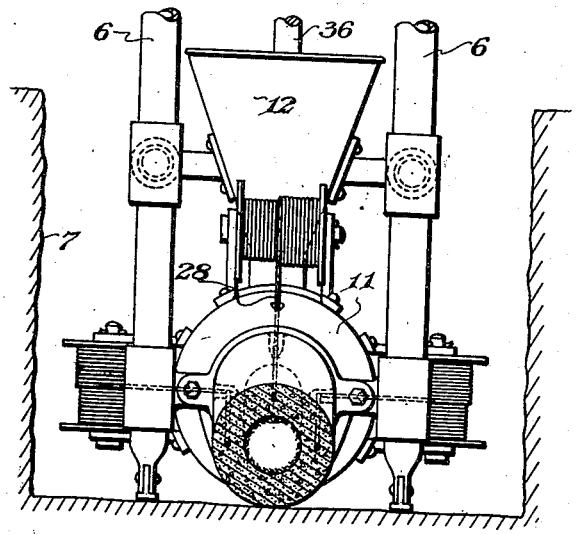
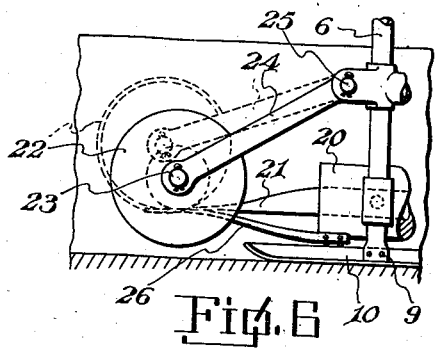
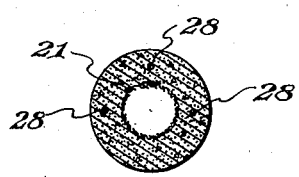

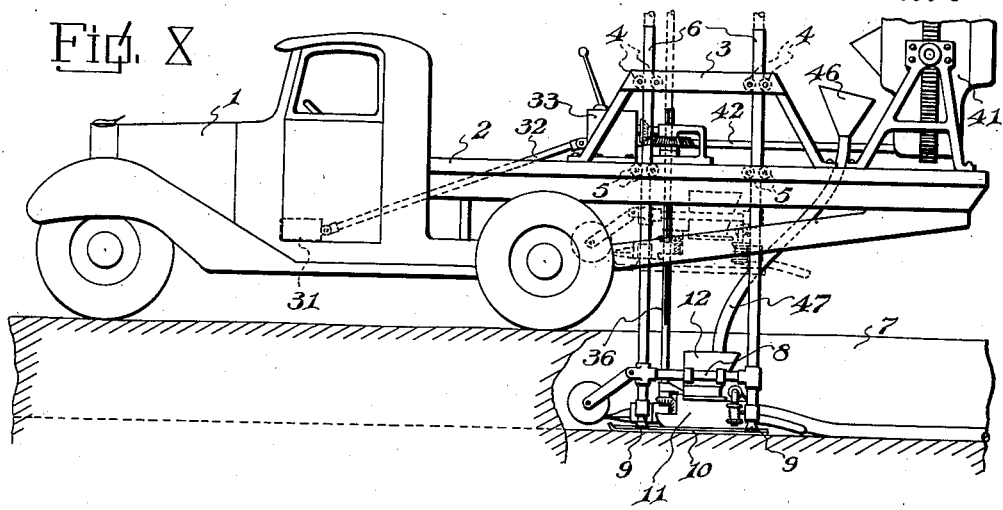
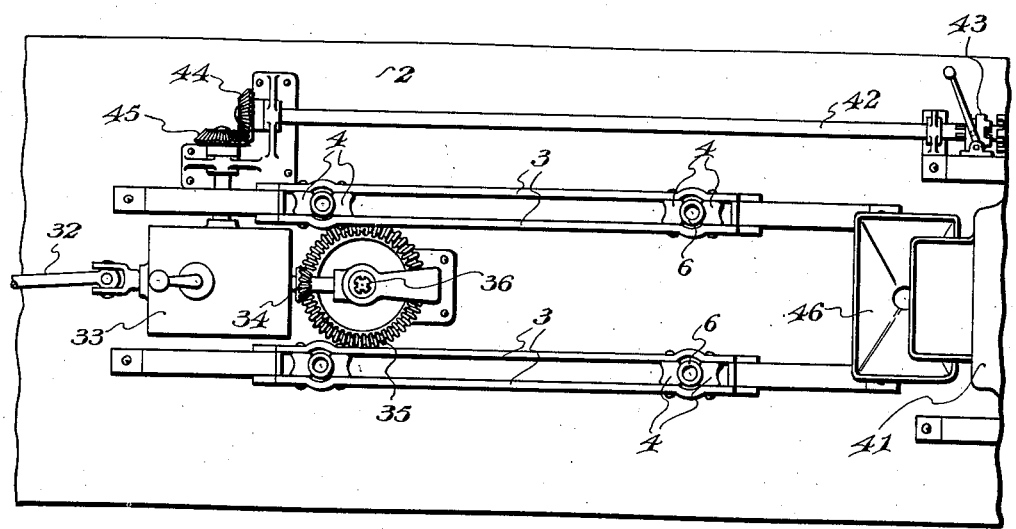

2,209,726

UNITED STATES PATENT OFFICE 2,209,726

IRRIGATION TILE MAKING MACHINE

Walter R. Fleming, Tulsa, Okla.

Application April 4, 1939, Serial No. 266,012

7 Claims. (Cl. 25—32)

The invention relates to irrigation tile or pipe making machines, and has for its object to provide a machine of this kind wherein a plastic pipe can be formed in a ditch or other place by a forming and expressing machine which is advanced as plastic material is fed thereto and the pipe formed and expressed.

A further object is to provide the machine with a forming tube, through which a woven reinforcing lining moves for reinforcing the inner periphery of the pipe. Also to provide a tapered bell for the reinforcing material for bending the same into tubular form as the material is fed into the bell in a flat form.

A further object is to provide means whereby the lower side of the reel, from which the flat reinforcing material is fed, is maintained at a constant level with the lower side of the reinforcing lining as material is fed from the reel.

A further object is to provide wire reels on the outer shell of the device, and from which reinforcing wires are fed to a position where they will be imbedded in the wall of the pipe as it is formed.

A further object is to provide a rotatable worm around the reinforcing feed pipe for feeding plastic material from the hopper to the expressing point.

A further object is to support the device from a vehicle body above a ditch, and to operate the parts of the machine from power carried by the vehicle. Also to operate a concrete mixing machine from the vehicle power and to provide chute means for conveying the mixed concrete from the mixing machine to the hopper of the pipe forming machine.

A further object is to provide means whereby the pipe forming machine may move upwardly and downwardly in relation to the vehicle body and advance therewith, thereby allowing the pipe forming machine to adjust itself to uneven surfaces.

A further object is to provide the under side of the pipe forming machine with skids adapted to engage the ground and slide thereover as the machine is advanced during a pipe forming operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical longitudinal sectional view through the pipe forming machine showing the machine in a ditch.

Figure 2 is a top plan view of the pipe forming machine.

Figure 3 is a front elevation of the pipe forming machine.

Figure 4 is a rear elevation of the pipe forming machine.

Figure 5 is a detail perspective view of the tapered bell, showing the liner being bent to tubular form.

Figure 6 is a side elevation of the liner reel supporting means, showing in full and dotted lines how the lower side of the reel material is maintained in constant relation to the lower side of the forming bell.

Figure 7 is a vertical transverse sectional view through the formed pipe.

Figure 8 is a side elevation of a truck, showing the pipe forming machine suspended therefrom.

Figure 9 is a top plan view of the operating mechanism mounted on the truck body.

The present application sets forth improvements on my prior application, Ser. No. 740,305, filed August 17, 1934.

Referring to the drawings, the numeral 1 designates a motor driven vehicle of conventional type, and 2 the rearwardly extending body carried thereby, which body is of the platform type. Mounted on the upper side of the body 2 is a rigid frame 3, having spaced guide rollers 4 in the upper portion thereof and in vertical alinement with spaced guide rollers 5 carried by the body 1. Vertically movable between the guide rollers 4 and 5 are downwardly extending uprights 6, which extend downwardly into the trench or ditch 7, as clearly shown in Figure 8.

The lower ends of the uprights 6 are rigidly connected together by means of horizontal bars 8 so the uprights will move upwardly and downwardly in unison as the pipe forming machine moves over uneven ground in the bottom of the ditch. The lower ends of the uprights 6 are connected at 9 to ground engaging skids 10, disposed on opposite sides of the pipe forming machine.

The pipe forming machine comprises an outer shell 11 having a hopper 12 secured to the upper side of the shell in any suitable manner, and the shell and hopper are held in stationary position by means of brace arms 13 connecting the hopper and the bars 8. The shell is additionally braced at its discharge end by connections 14 to the rear standards 6. Rotatably mounted within the shell 11 is a worm sleeve 15 having a feeding worm 16 on the outer periphery thereof, and which worm feeds concrete 17 from the hopper 12 to the discharge end 18 of the pipe forming machine, as the machine is advanced through the ditch 7. Extending axially through the worm sleeve 15 is a liner receiving tube 19, the front end of which is provided with a liner forming tapered bell 20, through which the strip of lining material 21 is fed from a flat form on the reel 22, and is bent into a cylindrical form by the tapered bell and passed through the tube 19 to the discharge end 18 to form a cylindrical woven wire lining for the pipe as the pipe is formed, and ejected from the pipe forming machine. The liner reel 22 is rotatably mounted on a shaft 23 carried by the outer ends of the upwardly and downwardly movable reel arms 24, which arms are pivotally connected at 25 to the forward uprights 6, as clearly shown in Figure 1. To insure a proper feeding of the liner strip 21 into the tapered bell 20 the lower part of the reeled material should be maintained on the same plane as the lower side of the inner periphery of the tube 19.

To accomplish this result a forwardly and upwardly extending reel support 26 is provided and which support engages the under side of the reeled material so the periphery of the reeled material, as the diameter thereof varies, will be in the same horizontal plane as the bottom of the inner periphery of the tube 19. The hinged arms 24 allows downward movement of the reel 22.

The forward end of the shell 11 is restricted as shown in Figure 1, as well as the forward end of the worm casing 15, so the concrete will be compressed to eliminate air pockets at the discharge end and to squeeze excess moisture therefrom. The rear end of the shell, at its lower side, is provided with a rearwardly and outwardly extending shoe 27, over which the formed pipe slides for depositing the pipe on the ground as the machine is advanced through the ditch. To longitudinally reinforce the wall of the pipe, as it is discharged from the machine, wires 28 are fed from wire spools 29 carried at spaced intervals on the outer side of the shell 11. The wires 28 extend through rearwardly converging apertures 30 in the rear end of the shell 11 so they will be embedded in the pipe structure, as clearly shown in Figure 1.

The worm drum 15 is rotated from a power take off 31 of the truck 1 through a drive shaft 32, which drives a conventional form of change speed mechanism 33 mounted on the truck body 1, which change speed mechanism in turn is provided with a driven bevelled gear 34, which meshes with a bevel gear 35 through which a downwardly extending splined shaft extends. The splined shaft 36 has its lower end rotatably mounted in a bearing 37 carried by the hopper 12, and terminates in a bevelled gear 38, which meshes with a bevelled gear 39, keyed at 40 to the forward end of the worm drum 15, therefore it will be seen that the worm drum can be controlled in speed of rotation from the truck body to regulate the speed of pipe forming operation to the speed of advancement of the truck.

Mounted on the truck body 2 is a concrete mixing machine 41, which concrete mixing machine is driven by a drive shaft 42 through a clutch mechanism 43. The shaft 42 extends forwardly and is provided with a bevel gear 44 which meshes with a drive bevel gear 45, driven through the change speed mechanism 33, hence it will be seen that the speed of operation of the concrete mixing machine may be varied, as desired. When the concrete machine 41 is tilted for a discharge operation the concrete enters the funnel 46 and passes by gravity through the discharge pipe 47 and discharged into the hopper 12, therefore it will be seen that a constant supply of concrete to the hopper can be maintained at all times, and that the mixing machine can be operated from the same source of power as the pipe forming machine.

From the above it will be seen that a pipe forming machine is provided which is particularly adapted for forming plastic pipes, for instance the character used in irrigation ditches, and said pipe is provided with a reinforcing liner as well as reinforcing wires as formed, thereby preventing collapsing of the formed pipe until the concrete sets, and at the same time bracing the pipe while in use.

The invention having been set forth what is claimed as new and useful is:

1. A plastic pipe forming machine adapted to be moved over the ground for forming a pipe as it is advanced, said machine comprising an outer shell, means for supporting said shell, a rotatable worm within the shell, means for feeding plastic material into the shell whereby the worm may discharge the same in tubular form at the rear end of the shell and means for feeding a tubular reinforcing member axially through the worm for forming a lining within the pipe as it is formed.

2. A device as set forth in claim 1 wherein the liner feeding means comprises a stationary tubular member extending axially through the worm, the forward end of said tubular member having a tapered entrance into which lining material is fed in a flat form and bent to tubular form as it passes through the tube.

3. The combination with a pipe forming machine comprising an outer shell, a rotatable worm within the shell, means for feeding plastic material into the shell around the worm to be expressed in tubular form at ends thereof, means for rotating the worm, of means for providing a tubular lining to the pipe as formed, said means comprising a tube extending through the worm and terminating at the discharge end thereof, an upwardly and downwardly movable reel forwardly of the tubular member, a reel support carried by the forward end of the tubular member and positioned to engage material on the reel in the plane of the lower side of the inner periphery of the tubular member, and a tapered entrance carried by the forward end of the tubular member and forming means whereby the material is bent from flat to cylindrical form as it enters and passes through the tubular member.

4. A device as set forth in claim 3 comprising wire carrying reels mounted on the outer side of the outer shell and apertured members carried by the rear end of the outer shell and through which wire reinforcing is fed in a position where the wire will be embedded within the wall of the pipe as formed.

5. A device as set forth in claim 3 including a rearwardly and downwardly extending pipe supporting member carried by the rear end of the shell and terminating adjacent the ground.

6. A device as set forth in claim 1 including means carried by the rear end of the shell for feeding reinforcing wires into the wall of the pipe as it is formed.

7. A device as set forth in claim 1 including a rearwardly extending pipe supporting member carried by the rear end of the shell and terminating adjacent the ground.

WALTER R. FLEMING.